US009433009B1

(12) United States Patent
Marupaduga et al.

(10) Patent No.: US 9,433,009 B1
(45) Date of Patent: Aug. 30, 2016

(54) CHANNEL SELECTION BASED ON CORRELATION BETWEEN AIR INTERFACE QUALITY AND LEVEL OF PORT-TO-PORT ISOLATION

(71) Applicant: Sprint Spectrum L.P., Overland Park, KS (US)

(72) Inventors: Sreekar Marupaduga, Overland Park, KS (US); John W. Prock, Raymore, MO (US); Ryan P. Dreiling, Lenexa, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 123 days.

(21) Appl. No.: 14/526,238

(22) Filed: Oct. 28, 2014

(51) Int. Cl.
*H04W 4/00* (2009.01)
*H04W 72/00* (2009.01)
*H04W 72/08* (2009.01)

(52) U.S. Cl.
CPC .................................. *H04W 72/085* (2013.01)

(58) Field of Classification Search
CPC .................................................. H04W 72/085
USPC ....................................................... 455/452.1
See application file for complete search history.

(56) References Cited

U.S. PATENT DOCUMENTS

| 8,630,643 | B2 * | 1/2014 | Weng | H04W 36/0083 370/331 |
| 2002/0155827 | A1 * | 10/2002 | Agrawal | H04L 29/12283 455/414.1 |
| 2002/0188723 | A1 * | 12/2002 | Choi | H04W 36/06 709/225 |
| 2002/0191703 | A1 * | 12/2002 | Ling | H04B 7/0417 375/267 |
| 2004/0147263 | A1 * | 7/2004 | Schwarz | H04W 36/06 455/436 |
| 2008/0225931 | A1 * | 9/2008 | Proctor | H04B 7/15542 375/214 |
| 2012/0270537 | A1 * | 10/2012 | Weng | H04W 48/16 455/424 |
| 2013/0244665 | A1 * | 9/2013 | Clevorn | H04W 52/0245 455/437 |
| 2014/0064199 | A1 * | 3/2014 | Pan | H04L 1/1867 370/329 |
| 2014/0281819 | A1 * | 9/2014 | Wood | G11C 16/349 714/773 |

* cited by examiner

*Primary Examiner* — Rafael Pérez-Gutiérrez
*Assistant Examiner* — Mark G. Pannell

(57) ABSTRACT

Disclosed is a method and system for channel selection. As disclosed, a wireless communication system includes a base station that is configured to operate on a plurality of channels, each having a respective level of port-to-port isolation. The system determines a measure of quality of an air interface between the base station and a user equipment device (UE) served by the base station. The system then selects, from the plurality of channels, a channel on which the base station should serve the UE, where the selecting is based at least in part on (i) the determined measure of quality of the air interface between the base station and the UE and (ii) a correlation between the determined measure of quality of the air interface and the respective level of port-to-port isolation of the channel. Upon the selection, the base station serves the UE on the selected channel.

20 Claims, 11 Drawing Sheets

| MEASURE OF AIR INTERFACE QUALITY [CQI LEVEL] | LEVEL OF PORT-TO-PORT ISOLATION |
|---|---|
| 1 | 75 dB |
| 7 | 40 dB |
| 15 | 15 dB |

Fig. 6A

| MEASURE OF AIR INTERFACE QUALITY [CQI LEVEL] | LEVEL OF PORT-TO-PORT ISOLATION |
|---|---|
| 1 | 41 dB . . . . . 75 dB |
| 7 | 16 dB . . . . . 40 dB |
| 15 | 0 dB . . . . . 15 dB |

Fig. 6B

| MEASURE OF AIR INTERFACE QUALITY [CQI LEVEL] | LEVEL OF PORT-TO-PORT ISOLATION |
|---|---|
| 0 ..... 6 | 75 dB |
| 7 ..... 10 | 40 dB |
| 11 ..... 15 | 15 dB |

Fig. 6C

| MEASURE OF AIR INTERFACE QUALITY [CQI LEVEL] | LEVEL OF PORT-TO-PORT ISOLATION |
|---|---|
| 0 ..... 6 | 41 dB ..... 75 dB |
| 7 ..... 10 | 16 dB ..... 40 dB |
| 11 ..... 15 | 0 dB ..... 15 dB |

Fig. 6D

| CHANNELS | LEVEL OF PORT-TO-PORT ISOLATION |
| --- | --- |
| A | 75 dB |
| B | 40 dB |
| C | 15 dB |

Fig. 7

CHANNEL SELECTION BASED ON CORRELATION BETWEEN AIR INTERFACE QUALITY AND LEVEL OF PORT-TO-PORT ISOLATION

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of UEs, initiation of communications, handover between coverage areas, and other functions related to air interface communication.

In accordance with the air interface protocol, each coverage area may operate on one or more carrier frequencies or ranges of carrier frequencies. Further, each coverage area may define a number of channels or specific resources for carrying signals and information between the base station and UEs. For instance, certain resources on the downlink may be reserved to carry a pilot or reference signal that UEs may detect as an indication of coverage and may measure to evaluate coverage quality. Further, certain resources on the uplink may be reserved to carry access requests from UEs seeking to gain access to the base station. And certain resources on the downlink may be reserved to carry control messaging such as paging messages and random access response messages from the base station. In addition, certain resources on the uplink and downlink may be set aside to carry bearer traffic (e.g., user communications) in a manner assigned or scheduled by the base station for instance.

In general, a UE may operate in a particular coverage area provided by a base station by transmitting to the base station an "attach" request or the like to register with the base station and trigger reservation of network resources for the UE, and then operating in a connected mode or an idle mode. In the connected mode, the UE may have assigned air interface resources defining an air interface "connection," and the UE and the base station may be set to exchange bearer data with each other, with the base station possibly providing downlink control signaling to the UE to assign specific air interface resources on which the bearer data communication is to occur. After a timeout period of no bearer data communication between the UE and the base station, or for other reasons, the UE may then transition from the connected mode to the idle mode, with the base station releasing the UE's air interface connection so as to conserve air interface resources. In the idle mode, the UE may then monitor a downlink control channel to receive overhead system information and to check for any page messages destined to the UE. If the UE then receives a page message to which the UE will respond and/or if the UE seeks to engage in bearer communication, the UE may then transmit on an uplink control channel to the base station a random access preamble or other such request, to which the base station may respond on a downlink control channel, and the UE may transition back to the connected mode.

OVERVIEW

In practice, a base station may serve multiple UEs on one or more frequency channels, each such channel spanning a particular frequency bandwidth. Additionally, the base station in a wireless communication system can take various forms. For instance, the base station could be a macro base station operated by a wireless carrier to provide a broad range of coverage and may thus include a tall antenna tower and a power amplifier for providing high transmission power. Alternatively, the base station could be a small cell base station ("small cell"), such as a femtocell, typically having a much smaller form factor and operating at lower transmission power for providing a smaller range of coverage.

In either case, an antenna arrangement of the base station may receive a plurality of input feeds, where each such input feed may include one or more of the frequency channels. The base station may then combine, using one or more combiners, at least some of the input feeds into combined outputs for air interface transmissions that serve the UEs. For example, a combiner may include two input ports and an output port. One of the input ports may receive an input feed including a frequency channel A and the other one of the input ports may receive an input feed including a frequency channel B. The combiner may combine the input feeds into an output feed including both frequency channels A and B. As such, the combiner may provide this output feed via the output port to allow for an air interface transmission including the combined output of frequency channels A and B.

Moreover, a combiner may include two or more input ports and each such input port may include a filter, such as a band-pass filter. This filter may allow some set of intended frequencies to pass through an intended pass band, and these frequencies may include one or more frequency channels. However, depending on the filter design, the filter may also allow some unwanted (e.g., spurious) emissions to pass through. These unwanted emissions may include unintended frequencies transmitted outside of the intended pass band. Additionally, some situations may involve unwanted emissions, passed by a filter of a first input port, being within an intended pass band of a filter of a second input port that is within the same combiner as the first input port. In such situations, the unwanted emissions may end up being perceived as noise by a UE being served on a frequency channel that is within the intended pass band of the second input port.

In a wireless communication system, a level of port-to-port isolation may be a property of a given pair of input ports that defines an ability to minimize (or eliminate) noise in one of the input ports due to "leakage" of unwanted emissions from the other one of the input ports, and vice versa. A higher level of port-to-port isolation may thus lead to less noise compared to a lower level of port-to-port isolation. Additionally, a level of port-to-port isolation may depend on (i) proximity of frequencies in an intended pass band of one of the input ports to frequencies in an intended pass band of the other one of the input ports and (ii) design of the filters at the respective input ports, among other possibilities. As such, the likelihood of added noise may increase if frequencies in an intended pass band of one of the input ports are close to frequencies in an intended pass band of the other one of the input port and/or if design of one or more of the filters is less ideal.

In this manner, each pair of input ports may have a different respective level of port-to-port isolation. Since an input port may receive an input feed including one or more frequency channels, each such frequency channel may thus have a respective level of port-to-port isolation. As a result, the base station may serve some UEs on frequency channels having lower respective levels of port-to-port isolation while serving other UEs on frequency channels having higher respective levels of port-to-port isolation.

If a base station serves a UE over a frequency channel having a relatively low level of port-to-port isolation, the UE's ability to tolerate added noise due to the low level of port-to-port isolation may depend on a quality of an air interface between the UE and the base station. For example, a lower quality of the air interface may increase the UE's difficulty of reception and serving a UE over a frequency channel having a relatively low level of port-to-port isolation may further increase the UE's difficulty of reception. As such, this may potentially lead to a significantly reduced call quality, among other undesirable outcomes.

Disclosed herein is an arrangement to help overcome this problem, and particularly to help avoid issues resulting from added noise due to lower levels of port-to-port isolation. In accordance with the disclosure, a wireless communication system may seek to select a frequency channel for serving the UE based on a consideration of (i) a quality of the air interface between the UE and the base station (e.g., reported downlink channel conditions) and (ii) levels of port-to-port isolation for various frequency channels on which the base station may serve the UE.

In particular, if the wireless communication system determines that quality of the air interface between the UE and the base station is relatively low, the wireless communication system may select a frequency channel having a relatively high level of port-to-port isolation. This may help avoid (or reduce) added noise due to low port-to-port isolation that further increases the UE's difficulty of reception. In contrast, if the wireless communication system determines that quality of the air interface between the UE and the base station is relatively high, the wireless communication system may select a frequency channel having a relatively low level of port-to-port isolation. The system can make such a selection because the UE may tolerate added noise due to low port-to-port isolation when the quality of the air interface is relatively high.

Accordingly, disclosed herein is a method operable in a wireless communication system that includes a base station that radiates to provide wireless coverage in which to serve UEs. The base station is configured to operate on a plurality of channels, each having a respective level of port-to-port isolation. In accordance with the method, the wireless communication system determines a measure of quality of an air interface between the base station and a UE served by the base station. Such a measure may be a Channel Quality Indicator (CQI) received via a CQI report from the UE, among other possible measures.

The wireless communication system then selects, from the plurality of channels, a channel on which the base station should serve the UE. Selecting the channel is based at least in part on (i) the determined measure of quality of the air interface between the base station and the UE and (ii) a correlation between the determined measure of quality of the air interface and the respective level of port-to-port isolation of the channel. Based on the selecting, the wireless communication system then causes the base station to serve the UE on the selected channel.

Additionally, disclosed herein is a wireless communication system including a base station that radiates to provide wireless coverage in which to serve UEs. The base station is configured to operate on a plurality of channels, each having a respective level of port-to-port isolation. The wireless communication system also includes a controller that may be separate from the base station or may be part of the base station. The controller is configured to determine a measure of quality of an air interface between the base station and a UE served by the base station. The controller is then configured to select, from the plurality of channels, a channel on which the base station should serve the UE.

Selecting the channel is based at least in part on (i) the determined measure of quality of the air interface between the base station and the UE and (ii) a correlation between the determined measure of quality of the air interface and the respective level of port-to-port isolation of the channel. Based on the selecting, the controller is configured to cause the base station to serve the UE on the selected channel.

Further, in another respect, disclosed is a non-transitory computer-readable medium having stored thereon instructions executable by a processor to cause a wireless communication system to carry out functions such as those noted above, to facilitate selection of the channel.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIGS. 6A-6D are conceptual illustrations depicting different types of correlation between measures of quality of an air interface and levels of port-to-port isolation, in accordance with an example embodiment.

FIG. 7 is a conceptual illustration depicting channel selection based on levels of port-to-port isolation, in accordance with an example embodiment.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
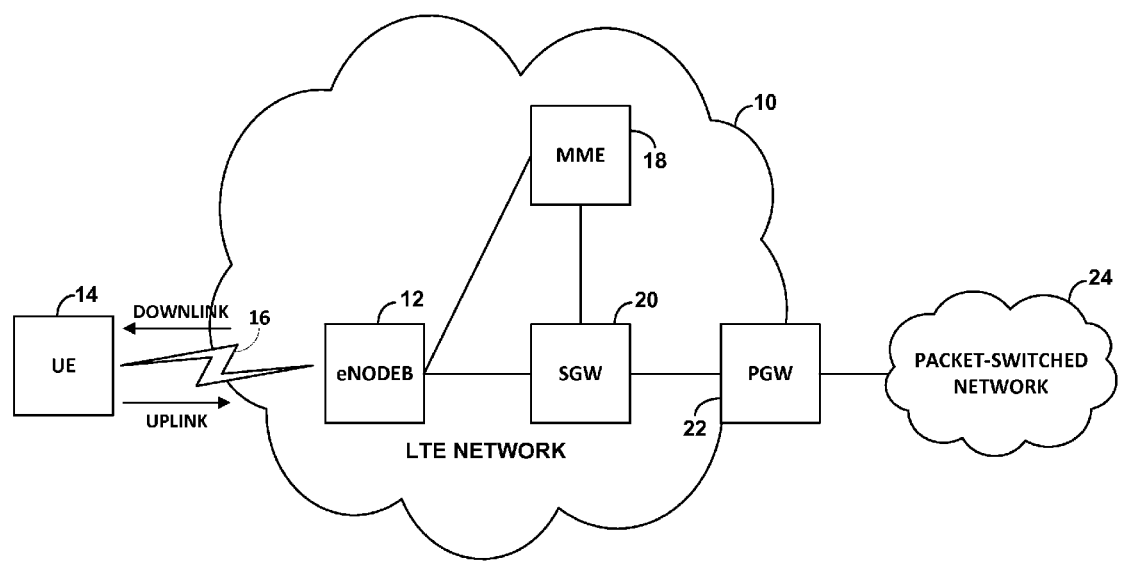
FIG. 1 is a simplified block diagram of a wireless communication system in which the present method can be implemented.

Referring to the drawings, FIG. 1 is a simplified block diagram of a wireless communication system in which the present method can be implemented. In particular, FIG. 1 depicts a representative LTE network 10, which functions primarily to serve UEs with wireless packet data communication service, including possibly voice over Internet Protocol (VoIP) service, but may also provide other functions. As shown, the LTE network 10 includes at least one example LTE macro base station known as an eNodeB 12, which has an antenna structure and associated equipment for providing an LTE coverage area in which to serve UEs such as an example UE 14. More specifically, the eNodeB 12 radiates to define a wireless air interface 16 through which the eNodeB 12 may communicate with one or more served UEs, such as UE 14, via the downlink and the uplink.

A base station (such as eNodeB12) may operate to serve UEs on one or more frequency channels that may each span some frequency bandwidth. In particular, the base station may transmit signaling (e.g., to a UE) on a set of air interface resources reserved to define a downlink frequency channel. Additionally, the base station may receive signaling (e.g., from a UE) on a set of air interface resources reserved to define an uplink frequency channel. By way of example, the base station may transmit signaling, on a downlink control channel, that may include control signaling and/or bearer communication, among other possibilities.

As shown in FIG. 1, the eNodeB 12 has a communication interface with a Mobility Management Entity (MME) 18 that functions as a signaling controller for the LTE network 10. Further, the eNodeB 12 has a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeB 12 may be communicatively linked with one or more core networks, which may be operated by the one or more wireless service providers. The core network(s) then provide connectivity with one or more MMEs, such as MME 18, as well as one or more gateways such as SGW 20 and PGW 22.

Figure 2:
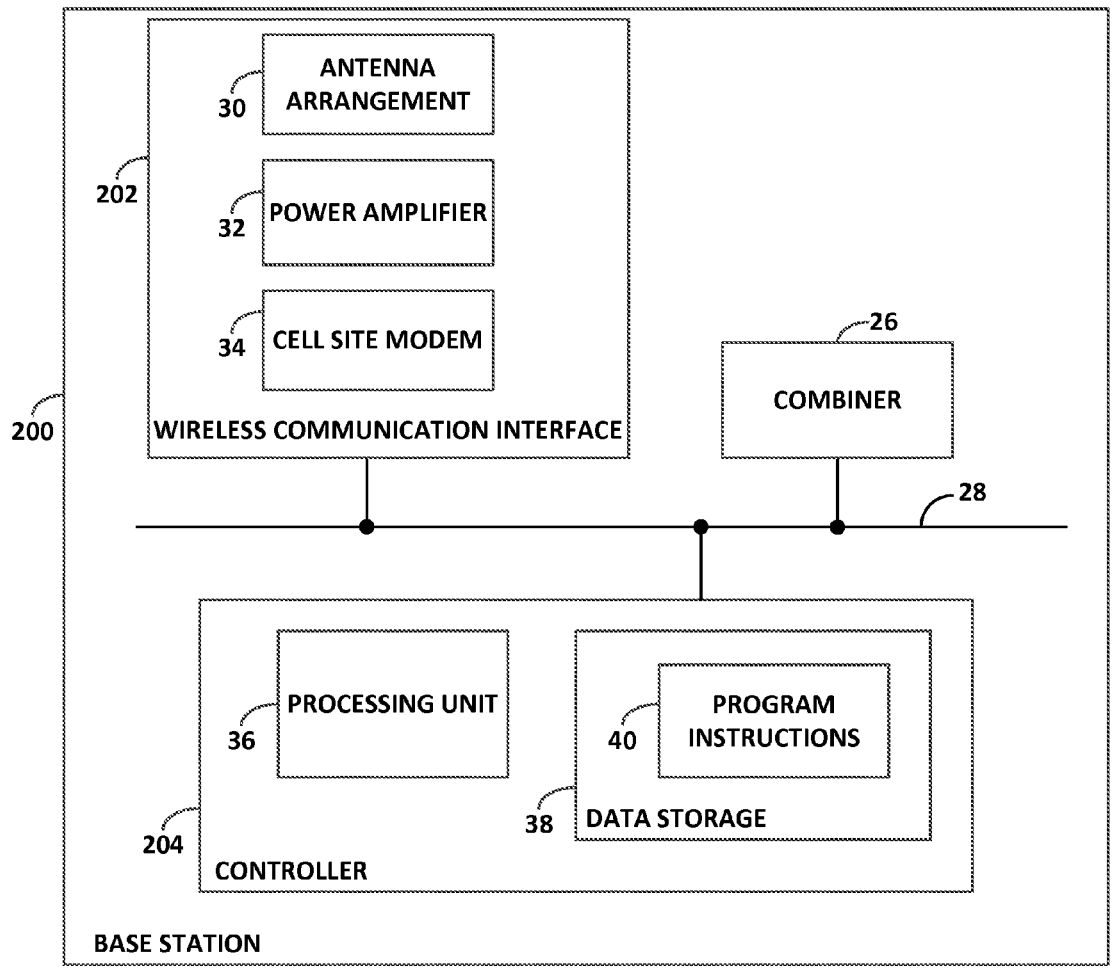
FIG. 2 is a simplified block diagram of a base station in which the present method can be implemented.

FIG. 2 is next a simplified block diagram of a representative base station 200 such as eNodeB 12, illustrating some of the components that can be included in such an entity. As shown in FIG. 2, the representative base station 200 may include a wireless communication interface 202, a controller 204, and at least one combiner 26. As shown, these components of the base station 200 may be communicatively linked together by a system bus, network, or other connection mechanism 28. Alternatively, they may be integrated together in various ways.

As shown, wireless communication interface 202 may include an antenna arrangement (i.e., antenna structure) 30, which may be tower mounted, and associated components such as a power amplifier 32 and a cell site modem 34 for engaging in air interface communication with UEs via the antenna arrangement 30, so as to transmit data and control information to the UEs and receive data and control information from the UEs. In practice, the power amplifier 32 may have a maximum transmission power that the base station 200 can use for transmission across the downlink at any given time.

The base station 200 may also include a controller 204 that is arranged to manage or carry out various functions such as those discussed herein. As shown, the controller 204 may include processing unit 36 and data storage 38. Processing unit 36 may then comprise one or more general purpose processors (e.g., microprocessors) and/or special-purpose processors (e.g., digital signal processors and/or application specific integrated circuits) and may be integrated in whole or in part with the wireless communication interface 202. And data storage 38 may include one or more volatile and/or non-volatile storage components, such as magnetic, optical, flash, or other types of non-transitory computer readable media, and may be integrated in whole or in part with processing unit 36.

As shown, data storage 38 may hold (have encoded thereon) program instructions 40, which may be executable by processing unit 36 to carry out various controller functions. As such, the processing unit 36 programmed with instructions 40 may define part or all of a controller for controlling operation of the base station 200. Alternatively or additionally, however, such control functionality could be provided external to the base station 200, in another entity (e.g., separate from the base station 200) such as by a base station control entity (e.g., MME 18), which may be communicatively linked with the base station and may serve to control certain aspects of base station operation generally.

A representative base station 200 may further include at least one combiner 26 that receives input feeds and processes the input feeds into combined outputs for air interface transmissions that serve the UEs. In one case, each input feed may include one frequency channel. In another case, at least some input feeds may include more than one frequency channel. In this case, the frequency channels may have been previously combined into a single feed (e.g., using a separate combiner), among other possibilities. Other cases may also be possible.

Figure 3A:
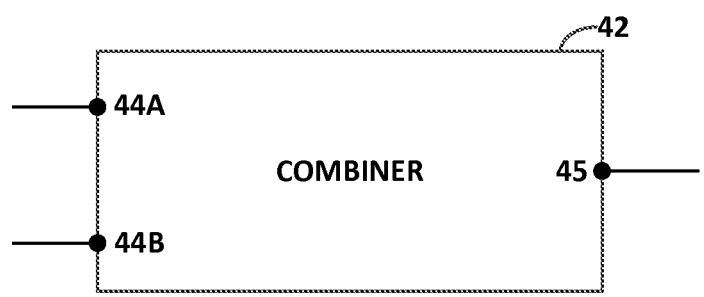
FIGS. 3A-3D are conceptual illustrations of example combiners in a base station, in accordance with an example embodiment.
Figure 3B:
Figure 3C:
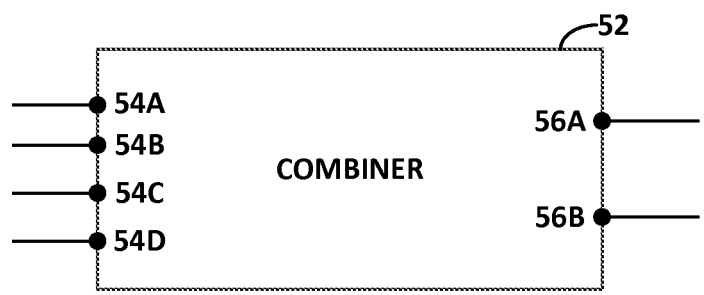

A combiner may take various forms that may include various combinations of input ports and output ports, where the number of input ports is larger than the number of output ports. Without limitation, FIGS. 3A-3C illustrate example combiners 42, 46, and 52. In one case, as shown in FIG. 3A, an example combiner 42 may include two input ports 44A-44B and an output port 45. Input port 44A may receive a first input feed while input port 44B may receive a second input feed. The combiner 42 may combine the input feeds into an output feed including a combination of the first and second input feeds and may then provide this output feed via the output port 45.

In another case, as shown in FIG. 3B, an example combiner 46 may include four input ports 48A-48D and an output port 50. The combiner 46 may combine input feeds received by the input ports 48A-48D into an output feed including a combination of the input feeds and may then provide this output feed via the output port 50. Additionally, an example combiner may carry out combinations even if not every input port of the combiner receives an input feed. For instance, if input feeds are received at input ports 48A-48C but no input feed is received at input port 48D, the output feed at output port 50 would include a combination of the input feeds at input ports 48A-48C.

In yet another case, as shown in FIG. 3C, an example combiner 52 may include four input ports 54A-54D and multiple output ports, such as output ports 56A-56B. In this case, the combiner 52 may carry out any combination of input feeds at the input ports 54A-54D into combined output feeds at output ports 56A-56B. In one example, the combiner 52 may combine input feeds received by input ports 54A-54B into an output feed including a combination of these input feeds and may then provide this output feed via output port 56A (or output port 56B). In this example, the combiner 52 may also combine input feeds received by input ports 54C-54D into an output feed including a combination of these input feeds and may then provide this output feed via output port 56B (or output port 56A if the above combination in this example is provided via output port 56B).

In another example, the combiner 52 may combine input feeds received by input ports 54A and 54C into an output feed including a combination of these input feeds and may then provide this output feed via output port 56A (or output port 56B). In this example, the combiner 52 may also combine input feeds received by input ports 54B and 54D into an output feed including a combination of these input feeds and may then provide this output feed via output port 56B (or output port 56A if the above combination in this example is provided via output port 56B).

In yet another example, the combiner 52 may combine input feeds received by input ports 54A-54C into an output feed including a combination of these input feeds and may then provide this output feed via output port 56A (or output port 56B). In this example, the combiner 52 may also transmit an input feed received by the input port 54D as an output feed via output port 56B (or output port 56A if the above combination in this example is provided via output port 56B).

Note that other examples and additional cases may also be possible without departing from the scope of the disclosure. Additionally, note that input feeds received by adjacent input ports may include frequencies that are contiguous or may include frequencies that are non-contiguous.

In a further aspect, each input port (or some of the input ports) of a combiner may include at least one filter, such as a filter taking the form of an electronic circuit (e.g., Resistor-Inductor-Capacitor (RLC) circuit) or taking the form of a digital filter (e.g., using signal processing), among other possibilities. Additionally, the filter may be a band-pass filter, a high-pass filter, or a low-pass filter, among other possible designs without departing from the scope of the disclosure. In either case, an example filter may allow only particular frequencies to pass through while filtering out the remaining frequencies. As such, a feed received at an input port of a combiner may pass through such a filter and thereby result in an input feed including the particular frequencies that are allowed to pass through. While example combiner 42, 46, and 52 are not shown to include filters, each input port (or some of the input ports) in the combiners may include a filter such as the example filters discussed in association with FIG. 3D below.

Figure 3D:
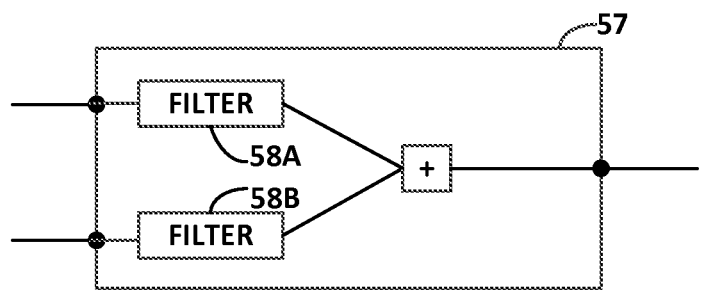

As shown in FIG. 3D, example filters 58A-58B may be a part of an example combiner 57. More specifically, filter 58A may couple to a first input port of the example combiner 57 while filter 58B may couple to a second input port of the example combiner 57. Upon receiving input feeds at the first and second input ports of the example combiner 57, each input feed may pass through the respective filter 58A-58B. Subsequently, the combiner 57 may combine the filtered input feeds into an output feed including a combination of the first and second input feeds and may then provide this output feed via the output port of the example combiner 57.

In another implementation (not shown), example filters 58A-58B may not be a part of an example combiner 57. For instance, an example implementation may involve the example filters being positioned before the input ports of the example combiner 57. In this example implementation, a first input feed may pass through filter 58A while a second input feed may pass through filter 58B. The example combiner 57 may then receive the filtered first and second input feeds via the first and second input ports, respectively. Subsequently, the combiner 57 may combine the filtered input feeds into an output feed including a combination of the first and second input feeds and may then provide this output feed via the output port of the example combiner 57. Other implementations may also be possible.

A pair of input ports in a combiner may have a corresponding level of port-to-port isolation. A design specification of the combiner (or a base station including the combiner) may designate levels of port-to-port isolation for pairs of input ports of the combiner. Thus, a wireless communication system may store information (e.g., in data storage 38) related to the levels based on the design specification. Since an input port may receive an input feed including one or more frequency channels, each such frequency channel may thus have a respective level of port-to-port isolation. As such, the stored information may also provide information related to respective levels of port-to-port isolation for a plurality of frequency channels that a base station may use to serve UEs.

Moreover, some implementations may involve the wireless communication system dynamically determining (and subsequently storing information related to) the levels of port-to-ports isolation. In particular, the wireless communication system may determine a level of port-to port isolation in various ways. In an example implementation, the system may assess (i) the signal strength (e.g., a first power level (P1)) at a particular frequency (or set of frequencies) in a first input port relative to (ii) signal strength (e.g., a second power level (P2)), at the same frequency (or set of frequencies), of "leaked" unwanted emissions from a second input port. For instance, the system may determine a decibel (dB) logarithmic unit used to express a ratio between the first and second power levels (e.g., Isolation level (dB)=10*log(P1/P2)). As such, a higher dB value may correspond with a higher level of port-to-port isolation while a lower dB value may correspond with a lower level of port-to-port isolation. Other example implementations may also be possible.

FIGS. 4A-4E show frequency functions of example filters, to help illustrate respective levels of port-to-port isolation for various frequency channels. In particular, the discussion of FIGS. 4A-4E below refers to various example filters. Such example filters may take the form of example filters 58A-58B, among other possibilities.

Figure 4A:
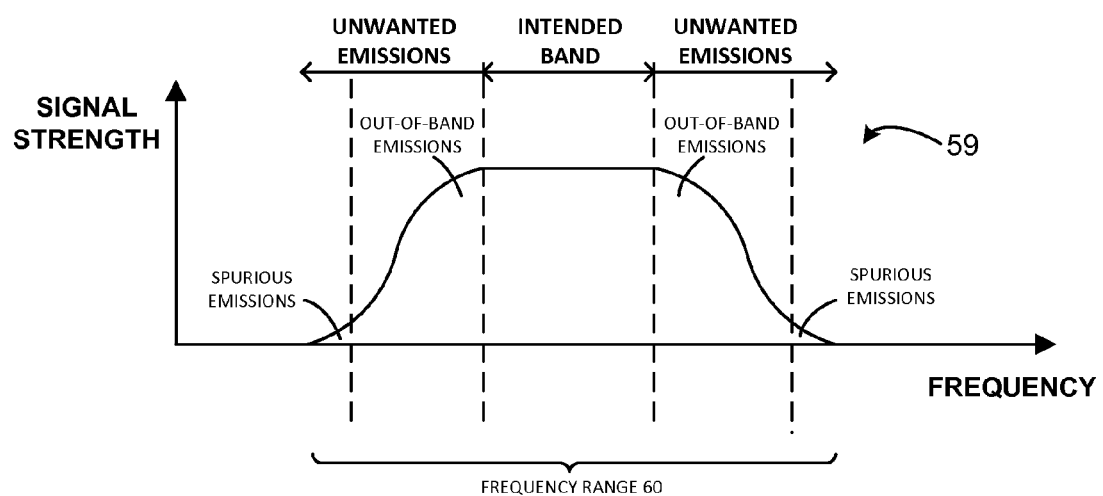
FIGS. 4A-4E are conceptual illustrations of frequency functions of example filters, in accordance with an example embodiment.

FIG. 4A shows a frequency vs. signal strength graph that illustrates a frequency function 58 of an example filter. As shown, the example filter of frequency function 59 may allow frequency range 60 to pass through while filtering out any frequencies outside of the frequency range 60. The frequency range 60 is shown to include an intended band that may include frequencies intended to pass through the filter by design. An ideal filter design would only allow frequencies in the intended band to pass through while completely filtering out unwanted frequencies (e.g., by presenting complete attenuation). As a result, an ideal filter design would only allow wanted frequencies to pass through.

However, the example filter of frequency function 59 may have a non-ideal filter design and may thus also allow some unwanted frequencies to pass through (e.g., due to partial attenuation at those frequencies), thereby resulting in unwanted emissions as illustrated by FIG. 4A. As shown, such unwanted emissions may include out-of-band emissions and/or spurious emissions. Out-of-band emissions may include emissions that occur outside of but in the immediate vicinity of the intended band. Whereas, spurious emissions may be more remote compared to out-of-band emissions and may include harmonics of emissions in the intended band, among other possibilities. Generally, spurious emissions may be reduced without affecting transmission of frequencies in the intended band (e.g., without reducing signal strength of frequencies in the intended band).

Depending on the filter design and the frequencies at issue, some extent of unwanted emissions, passed by a filter of a first input port, may be within an intended pass band of a filter of a second input port that is within the same combiner as the first input port. Such unwanted emissions may end up being perceived as noise by a UE being served on a frequency channel that is within the intended pass band of the second input port. As such, a level of port-to-port isolation may be a property of a given pair of input ports defining an ability to minimize (or eliminate) noise in one of the input ports due to "leakage" of unwanted emissions from the other one of the input ports, and vice versa. Higher levels of port-to-port isolation may thus include no or little unwanted emissions falling within the intended pass band of the second input port. Whereas, lower levels of port-to-port isolation may thus include a higher extent of unwanted emissions falling within the intended pass band of the second input port relative to the extent in higher levels of port-to-port isolation.

A level of port-to-port isolation for a given pair of input ports may depend on various factors. One example factor may be the design of one of or both the filters of the given pair of input ports. Filter design may relate to the type of filter (e.g., band-pass or high-pass) as well as a shape of the frequency function of a filter, among others. Another example factor may involve the design of a guard band separating the intended bands of the input ports. More specifically, design of the guard band may relate to a magnitude of a frequency range separating the intended band in one of the input ports from the intended band in the other one of the input ports. Alternatively, design of the guard band may relate to separation of unwanted frequencies in one of the input ports from unwanted frequencies in the other one of the input ports, among other possibilities. Other factors may also be possible.

Figure 4B:
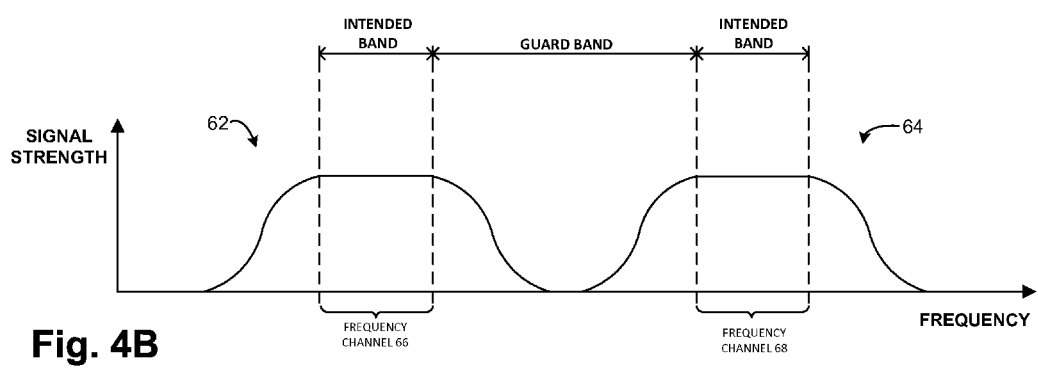
Figure 4C:
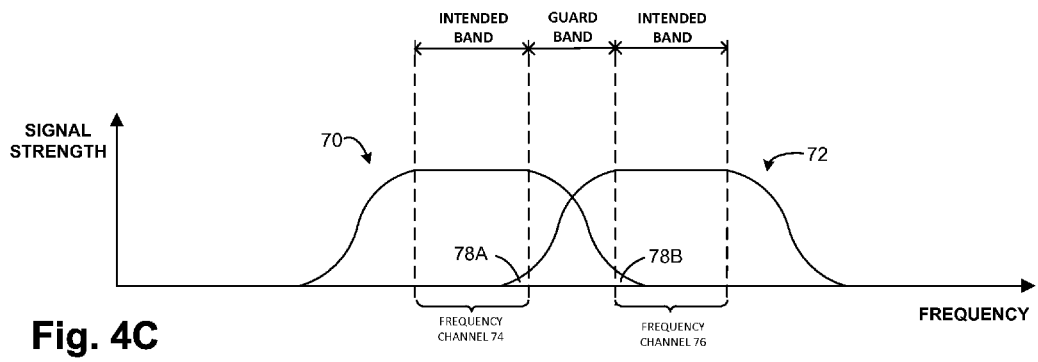

FIGS. 4B-4C show example graphs to illustrate example levels of port-to-port isolation resulting from such factors. Referring to the Figures, FIG. 4B shows frequency functions 62 and 64 of example filters for a pair of input ports in a combiner. In particular, the intended band of the filter of frequency function 62 includes frequency channel 66 while the intended pass band of the filter of frequency function 64 includes frequency channel 68. As shown, a guard band is separating the intended band of the filter of frequency function 62 from the intended band of the filter of frequency function 64. In this case, the magnitude of the frequency range separating the intended bands is sufficient to the extent that no unwanted emission from one of the input ports leaks onto the other one of the input ports, thereby resulting in a relatively high level of port-to-port isolation between the pair of input ports.

As a result, a UE served on frequency channel 66 may not perceive noise due to leakage of unwanted emissions from the input port including the filter of frequency function 64. Similarly, a UE served on frequency channel 68 may not perceive noise due to leakage of unwanted emissions from the input port including the filter of frequency function 62. In this manner, frequency channels 66 and 68 may each have relatively high respective levels of port-to-port isolation.

In contrast, FIG. 4C shows frequency functions 70 and 72 of example filters for another pair of input ports in a combiner. In particular, the intended band of the filter of frequency function 70 includes frequency channel 74 while the intended pass band of the filter of frequency function 72 includes frequency channel 76. As shown, a guard band is separating the intended band of the filter of frequency function 70 from the intended band of the filter of frequency function 72. In this case, the magnitude of the frequency range separating the intended bands is insufficient. More specifically, due to the design of the guard band as well the filter designs, some leakage 78A-78B of unwanted emissions from one of the input ports may leak onto the other one of the input ports and vice versa. This may lead to a lower level of port-to-port isolation between this pair of input ports compared to the level of port-to-port isolation for the pair of input ports discussed in association with FIG. 4B.

Note that, given the same guard band, different filter designs may change the level of port-to-port isolation. For instance, if the filters of frequency functions 70 and 72 were ideal filters (e.g., only allowing frequencies in the intended band to pass through), the guard band shown in FIG. 4C would be sufficient to the extent that no unwanted emission from one of the input ports leaks onto the other one of the input ports. Such a change in filter design may thus result in a higher level of port-to-port isolation between the pair of input ports.

Given the non-ideal filter design depicted in FIG. 4C, a UE served on frequency channel 74 may perceive noise due to leakage 78A of unwanted emissions from the input port including the filter of frequency function 72. Similarly, a UE served on frequency channel 76 may perceive noise due to leakage 78B of unwanted emissions from the input port including the filter of frequency function 70. In this manner, frequency channels 74 and 76 may each have relatively lower respective levels of port-to-port isolation compared to the respective levels of port-to-port isolation of frequency channels 66 and 68.

Figure 4D:
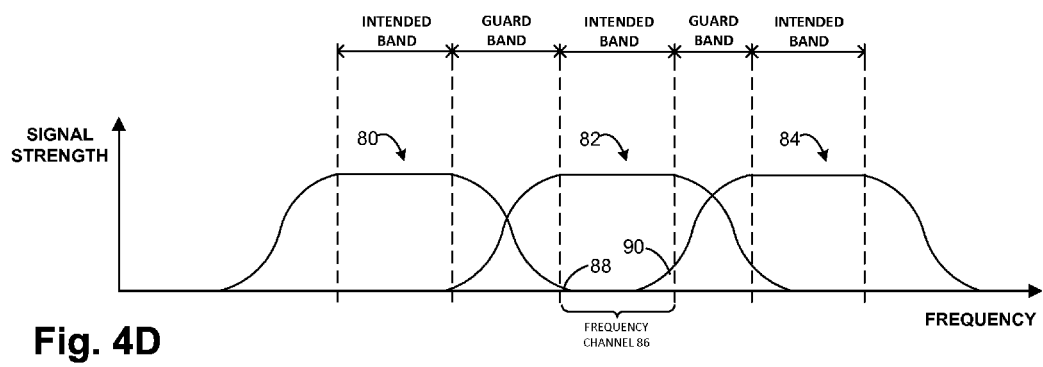

In some cases, a frequency channel may have a plurality of associated levels of port-to-port isolation. To illustrate, consider FIG. 4D showing frequency functions 80-84 of example filters for three input ports in a combiner. In particular, the intended band of the filter of frequency function 82 includes frequency channel 86 while the intended bands of the filters of frequency functions 80 and 84 may also include some other frequency channels (not shown). As shown, the input port including the filter of frequency function 82 may have a level of port-to-port isolation relative to the input port including the filter of frequency function 80 and may also have a level of port-to-port isolation relative to the input port including the filter of frequency function 84.

More specifically, design of the guard band separating the intended band of the filter of frequency function 80 from the intended band of the filter of frequency function 82 (and/or design of the filters of frequency functions 80 and 82) may result some leakage 88 of unwanted emissions from the input port including the filter of frequency function 80 onto the input port including the filter of frequency function 82. This may lead to a first level of port-to-port isolation associated with frequency channel 86. Similarly, design of the guard band separating the intended band of the filter of frequency function 84 from the intended band of the filter of frequency function 82 (and/or design of the filter of frequency functions 84 and 82) may result some leakage 90 of unwanted emissions from the input port including the filter of frequency function 84 onto the input port including the filter of frequency function 82. This may lead to a second level of port-to-port isolation associated with frequency channel 86.

As shown in FIG. 4D, the extent of the leakage 90 is greater than the extent of leakage 88. This means that the first level of port-to-port isolation associated with frequency channel 86 is higher than the second level of port-to-port isolation associated with frequency channel 86. In other words, the level of port-to-port isolation of the input port including the filter of frequency function 82 relative to the input port including the filter of frequency function 80 is higher than then level of port-to-port isolation of the input port including the filter of frequency function 82 relative to the input port including the filter of frequency function 84.

Given that a frequency channel may have a plurality of associated levels of port-to-port isolation, a wireless communication system may refer to the lowest level, among the plurality of associated levels, as the respective level of port-to-port isolation of the frequency channel. For instance, the respective level of port-to-port isolation of frequency channel 86 may be the second level of port-to-port isolation discussed above. More specifically, the wireless communication system may refer to the lowest level of port-to-port isolation of the channel because the lowest level may correspond with the highest extent of noise that a UE served on the channel may perceive. However, alternative implementations may involve the wireless communication system defining the respective level of port-to-port isolation of a channel as an average of the plurality of associated levels of port-to-port isolation, among other possibilities.

As noted above, the wireless communication system may store (e.g., in data storage 38) information related to respective levels of port-to-port isolation. If at least some of the channels each have multiple associated levels of port-to-port isolation, the information may include all of the associated levels of port-to-port isolation and may designate the respective (e.g., lowest) level of port-to-port isolation for each channel. Alternatively, the information may only include information related to the respective (e.g., lowest) level of port-to-port isolation for each channel. In either case, the wireless communication system may obtain such information on an as-needed basis from data storage 38. Other examples may also be possible.

Figure 4E:
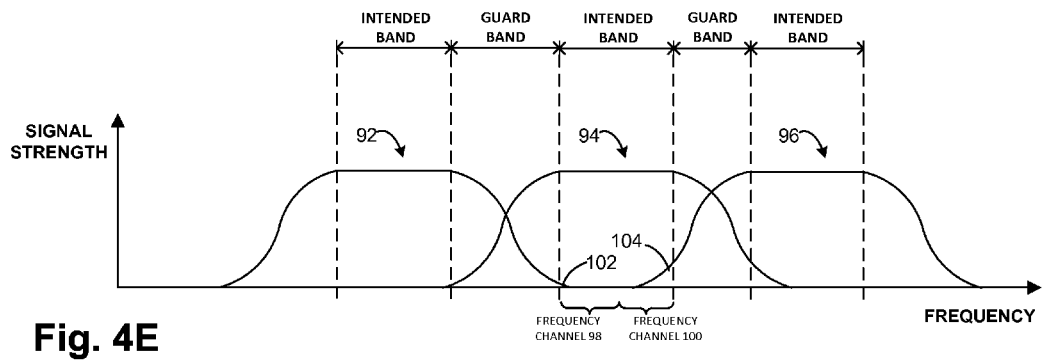

In some cases, an intended band of a filter coupled to an input port in a combiner may include multiple frequency channels. For instance, the multiple frequency channels may have been previously combined using a different combiner, among other possibilities. In such cases, each (or some) of these frequency channels may have different levels of port-to-port isolation. To illustrate, consider FIG. 4E showing frequency functions 92-96 of example filters for three input ports in a combiner. In particular, the intended band of the filter of frequency function 94 includes frequency channels 98 and 100 while the intended bands of the filters of frequency functions 92 and 96 may each include one or more other frequency channels (not shown). As shown, the input port including the filter of frequency function 94 may have a level of port-to-port isolation relative to the input port including the filter of frequency function 92 and may also have a level of port-to-port isolation relative to the input port including the filter of frequency function 96.

More specifically, design of the guard band separating the intended band of the filter of frequency function 94 from the intended band of the filter of frequency function 92 (and/or design of the filters of frequency functions 94 and 92) may result in some leakage 102 of unwanted emissions from the input port including the filter of frequency function 92 onto the input port including the filter of frequency function 94. This may lead to a certain level of port-to-port isolation associated with frequency channel 98 as the leakage 102 falls within channel 98. Similarly, design of the guard band separating the intended band of the filter of frequency function 96 from the intended band of the filter of frequency function 94 (and/or design of the filters of frequency functions 96 and 94) may result some leakage 104 of unwanted emissions from the input port including the filter of frequency function 96 onto the input port including the filter of frequency function 94. This may lead to a certain level of port-to-port isolation associated with frequency channel 100 as the leakage 104 falls within channel 100.

As shown in FIG. 4E, the extent of the leakage 104 is greater than the extent of leakage 102. This means that the level of port-to-port isolation associated with frequency channel 98 is higher than the level of port-to-port isolation associated with frequency channel 100. In this manner, different frequency channels within the same intended band of an input port may have different associated levels of port-to-port isolation.

Figure 5:
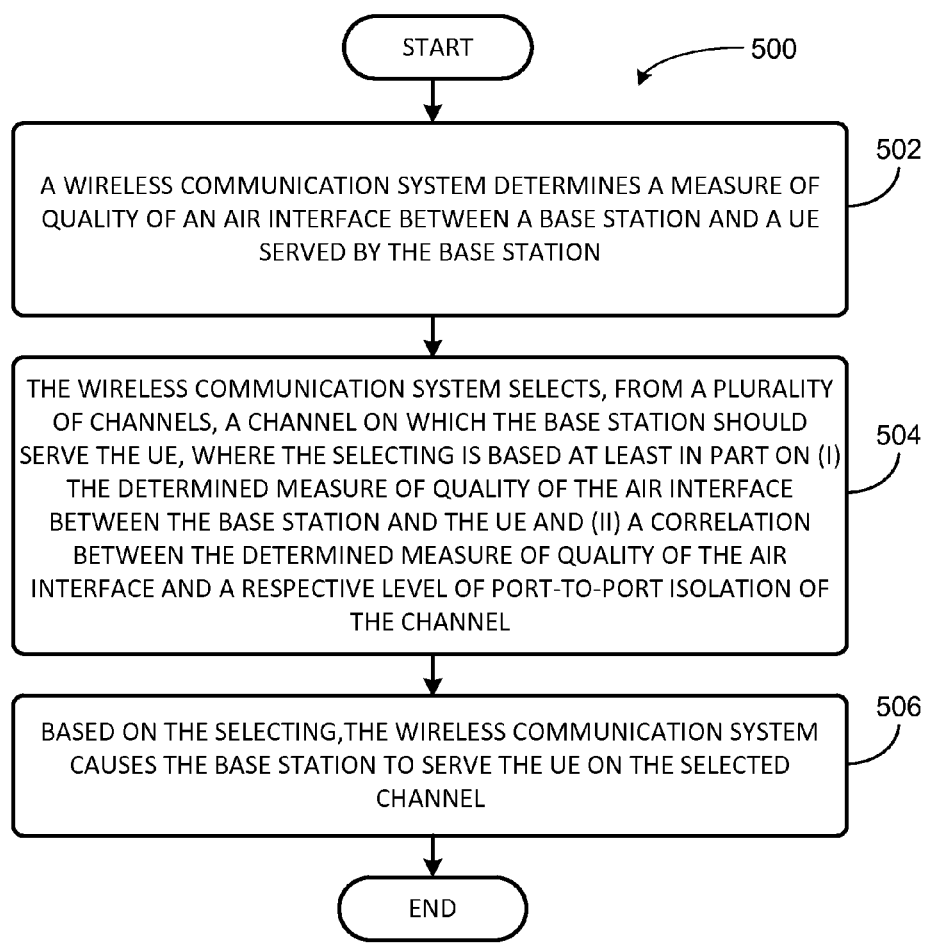
FIG. 5 is flowchart illustrating a method for channel selection, in accordance with an example embodiment.

FIG. 5 is a flowchart illustrating a method 500, according to an example embodiment. Illustrative methods, such as method 500, may be carried out in whole or in part by a component(s) and/or arrangement(s) in a wireless communication system, such as by the one or more of the components of the representative LTE network 10 shown in FIG. 1, with one or more of the components of the base station 200 shown in FIG. 2, and/or with the one or more of the combiner arrangements shown in FIGS. 3A-3C. However, it should be understood that example methods, such as method 500, may be carried out by other entities or combinations of entities as well as in other arrangements, without departing from the scope of the invention.

In particular, method 500 may be operable in a wireless communication system that includes a base station (e.g., eNodeB 12) that radiates to provide wireless coverage in which to serve UEs. The base station may operate on a plurality of channels, each having a respective level of port-to-port isolation. As shown by block 502 in FIG. 5, method 500 involves the wireless communication system determining a measure of quality of an air interface (e.g., wireless air interface 16) between the base station and a UE (e.g., UE 14) served by the base station. As shown by block 504 in FIG. 5, method 500 next involves the wireless communication system selecting, from the plurality of channels, a channel on which the base station should serve the UE, where the selecting is based at least in part on (i) the determined measure of quality of the air interface between the base station and the UE and (ii) a correlation between the determined measure of quality of the air interface and the respective level of port-to-port isolation of the channel. As shown by block 506 in FIG. 5, method 500 next involves, based on the selecting, the wireless communication system (e.g., using a controller) causing the base station to serve the UE on the selected channel.

By way of example, the wireless communication system may determine the measure of quality of the air interface based on a report from a UE. In particular, the UE may determine the measure of quality of the air interface from time to time (or continuously). For instance, a base station may send the UE a downlink reference signal and the UE may then determine downlink air interface quality by determining downlink reference signal strength and/or using one or more other factors (e.g., UE's capabilities). In some cases, the determined downlink air interface quality may correspond to the UE's channel quality, such as for a current channel on which the UE is operating. More specifically, the UE's channel quality may depend on observed signal-to-noise ratio (SNR), signal-to-interference plus noise ratio (SINR), and/or signal-to-noise plus distortion ratio (SNDR), among other factors.

Upon determining the measure, the UE may transmit this measure to the base station via the uplink or may transmit the measure via the base station to another entity of the wireless communication system. In particular, the UE may transmit the measure in response to a request for the measure by the base station (or another entity). Alternatively, the UE may be set to transmit the measure periodically or automatically in response to other triggers. In an example implementation, the UE may transmit to the base station a CQI report indicating the UE's determined channel quality. A CQI report may include a value (e.g., 0-15) representing the UE's channel quality, where higher values correspond with a higher channel quality and lower values correspond with a lower channel quality. Other example implementations may also be possible.

As noted above, block 504 of method 500 involves the wireless communication system selecting, from the plurality of channels, a channel (e.g., a downlink frequency channel) on which the base station should serve the UE. As noted, the system may carry out such selection based on the determined measure of quality of the air interface between the base station and the UE. Additionally, as noted, the system may carry out such selection based on a correlation between the determined measure of quality of the air interface and the respective level of port-to-port isolation of the channel.

In some cases, the wireless communication system may select the channel from among available channels. Such available channels may be channels on which no other UEs are currently being served by the base station. In this implementation, the wireless communication system may determine the available channels prior to carrying out the selection. In an alternative implementation, the selection may involve selection among all of (or some of) the plurality of channels. Other cases may also be possible.

In an example implementation, the wireless communication system may base channel selection on the determined measure of quality of the air interface between the base station and the UE. In addition to the measure of quality of the air interface, the wireless communication system may also base channel selection on a correlation between the determined measure of quality of the air interface and the respective level of port-to-port isolation of the channel. More specifically, if the wireless communication system determines that quality of the air interface between the UE and the base station is relatively low, then the wireless communication system may select a frequency channel having a relatively high level of port-to-port isolation. This may help avoid (or reduce) added noise, due to low port-to-port isolation, that further increases the UE's difficulty of reception. On the other hand, if the wireless communication system determines that quality of the air interface between the UE and the base station is relatively high, then the wireless communication system may select a frequency channel having a relatively low level of port-to-port isolation. The system can make such a selection because the UE may tolerate added noise due to low port-to-port isolation when the quality of the air interface is relatively high.

Moreover, such selection may involve obtaining information related to respective levels of port-to-port isolation for a plurality of channels (e.g., from data storage 38 as discussed above) and subsequently selecting a channel having a particular level of port-to-port isolation. If the information indicates that multiple channels have this particular level of port-to-port isolation, the system may select one of these channels arbitrarily or based on one or more other factors. However, if the information indicates that no channel (e.g., no available channel) has this particular level of port-to-port isolation, the system may select a channel having the closest level of port-to-port isolation to this particular level of port-to-port isolation.

FIGS. 6A-6D illustrate example implementations involving different types of correlation between determined measures of quality of the air interface and levels of port-to-port isolation. The types of correlation involve a one-to-one relationship, a one-to-many relationship, a many-to-one relationship, and a many-to-many relationship. However, these example implementations are shown for illustration purposes only and are not meant to be limiting.

FIG. 6A depicts a correlation involving a one-to-one relationship. In particular, when the wireless communication system determines a particular measure of air interface quality, the system may select a channel having a particular level of port-to-port isolation. For example, if the wireless communication system determines a measure including a CQI level of 1, the system may select a channel having a level of port-to-port isolation of 75 dB. Alternatively, if the wireless communication system determines a measure including a CQI level of 7, the system may select a channel having a level of port-to-port isolation of 40 dB. Alternatively, if the wireless communication system determines a measure including a CQI level of 15, the system may select a channel having a level of port-to-port isolation of 15 dB.

FIG. 6B next depicts a correlation involving a one-to-many relationship. In particular, when the wireless communication system determines a particular measure of air interface quality, the system may select a channel having a level of port-to-port isolation that is within a range (or set) of possible levels of port-to-port isolation. For example, if the wireless communication system determines a measure including a CQI level of 1, the system may select a channel having a level of port-to-port isolation that is within a range of possible levels of port-to-port isolation spanning 41 dB to 75 dB. Alternatively, if the wireless communication system determines a measure including a CQI level of 7, the system may select a channel having a level of port-to-port isolation that is within a range of possible levels of port-to-port isolation spanning 16 dB to 40 dB. Alternatively, if the wireless communication system determines a measure including a CQI level of 15, the system may select a channel having a level of port-to-port isolation that is within a range of possible levels of port-to-port isolation spanning 0 dB to 15 dB.

Note that, for sake of simplicity, correlation for CQI levels 2-6 and 8-14 is not shown in FIGS. 6A-6B. However, an example implementation may also involve correlations for such CQI levels, among other possible levels.

FIG. 6C next depicts a correlation involving a many-to-one relationship. In particular, when the wireless communication system determines a measure of air interface quality that is within a range (or set) of measures, the system may select a channel having a particular level of port-to-port isolation. For example, if the wireless communication system determines a measure including a CQI level between 0 and 6, the system may select a channel having a level of port-to-port isolation of 75 dB. Alternatively, if the wireless communication system determines a measure including a CQI level between 7 and 10, the system may select a channel having a level of port-to-port isolation of 40 dB. Alternatively, if the wireless communication system determines a measure including a CQI level between 11 and 15, the system may select a channel having a level of port-to-port isolation of 15 dB.

FIG. 6D next depicts a correlation involving a many-to-many relationship. In particular, when the wireless communication system determines a measure of air interface quality that is within a range (or set) of measures, the system may select a channel having a level of port-to-port isolation that is within a range (or set) of possible levels of port-to-port isolation. For example, if the wireless communication system determines a measure including a CQI level between 0 and 6, the system may select a channel having a level of port-to-port isolation that is within a range of possible levels of port-to-port isolation spanning 41 dB to 75 dB. Alternatively, if the wireless communication system determines a measure including a CQI level between 7 and 10, the system may select a channel having a level of port-to-port isolation that is within a range of possible levels of port-to-port isolation spanning 16 dB to 40 dB. Alternatively, if the wireless communication system determines a measure including a CQI level between 11 and 15, the system may select a channel having a level of port-to-port isolation that is within a range of possible levels of port-to-port isolation spanning 0 dB to 15 dB. Other example correlations may also be possible.

FIG. 7 next illustrates information related to channels having particular levels of port-to-port isolation. The wireless communication may store such information in data storage (e.g., data storage 38) and may obtain such information to determine a channel on which the UE should be served. In one example, if the system determines that the UE should be served on a channel having a level of port-to-port isolation of 75 dB, then the system may select channel A as the channel on which the UE should be served. In another example, if the system determines that the UE should be served on a channel having a level of port-to-port isolation of 40 dB, then the system may select channel B as the channel on which the UE should be served. In yet another example, if the system determines that the UE should be served on a channel having a level of port-to-port isolation of 15 dB, then the system may select channel C as the channel on which the UE should be served. Other examples may also be possible.

As noted above, block 506 of method 500 involves, based on the selecting, the wireless communication system (e.g., using a controller) causing the base station to serve the UE on the selected channel.

In one case, causing the base station to serve the UE on the selected channel may involve assigning a channel to a UE seeking to gain access to the base station (e.g., when the UE is not already being served by the base station). In particular, after the UE detects a reference signal as an indication of coverage, the UE may seek to gain access to the base station by transmitting to the base station an "attach" request or the like to register with the base station and trigger reservation of network resources for the UE. Such reservation of network resources may involve selecting a channel on which the UE should be served using the techniques discussed above in association with method 500. Subsequently, the base station may engage in control signaling with the UE to assign to the UE air interface resource reserved to define the selected channel, thereby causing the base station to serve the UE on the selected channel.

In another case, the UE may have already gained access to a base station and may be operating on an assigned channel. In this case, causing the base station to serve the UE on the selected channel may involve maintaining service to the UE on a current channel that the UE is being served on. In particular, the wireless communication system may determine that the UE should operate on a channel with a particular level of port-to-port isolation, such as based on a correlation with the measure of quality of the interface as discussed above. Subsequently, the system may carry out channel selection such as using the techniques discussed above in association with method 500. During channel selection, the wireless communication system may determine (e.g., using information from data storage) that the current channel that the UE is being served on has this particular level of port-to-port isolation. As a result, the wireless communication system may cause the base station to maintain service to the UE on a current channel that the UE is being served on as opposed to transitioning the UE from being served on a current channel to being served a different channel. This may involve the base station engaging in control signaling (e.g., using a downlink control channel) with the UE to indicate to the UE that the base station will continue serving the UE using air interface resources reserved to define the current channel, thereby causing the base station to maintain service the UE on the current channel.

In yet another case, such as when the UE already gained access to a base station and is operating on an assigned channel, causing the base station to serve the UE on the selected channel may involve transitioning the UE from being served on a current channel to being served on the selected channel. In this case, the selected channel may have a respective level of port-to-port isolation that is different from the respective level of port-to-port isolation of the current channel that is UE is being served on. In one example, the wireless communication system may determine that the measure of air interface quality corresponds to a relatively high quality of the air interface. In this example, the system may then determine that the UE should operate on a channel with a level of port-to-port isolation that is lower than the level of port-to-port isolation of the current channel. Thus, the wireless communication system may cause the UE to transition from being served on the current channel to being served on a selected channel having a lower respective level of port-to-port isolation. This may involve the base station engaging in control signaling (e.g., using a downlink control channel) with the UE to indicate to the UE the air interface resource reserved to define the selected channel and instructing the UE to transition from operating on the current channel to operating on the selected channel.

In another example, the wireless communication system may determine that the measure of air interface quality corresponds to a relatively low quality of the air interface. In this example, the system may then determine that the UE should operate on a channel with a level of port-to-port isolation that is higher than the level of port-to-port isolation of the current channel. Thus, the wireless communication system may cause the UE to transition from being served on the current channel to being served on a selected channel having a higher respective level of port-to-port isolation. This may involve the base station engaging in control signaling (e.g., using a downlink control channel) with the UE to indicate to the UE the air interface resource reserved to define the selected channel and instructing the UE to transition from operating on the current channel to operating on the selected channel. Other cases and examples may also be possible.

A wireless communication system can use the above techniques in various contexts. By way of example, in an LTE system, each frequency channel could be a separate LTE carrier available in a particular physical sector provided by an eNodeB. The eNodeB could then use these techniques as a basis to determine whether a UE should operate on a different LTE carrier than the one on which it is currently attached to. If the eNodeB determines that the UE should operate on a different LTE carrier, the eNodeB may responsively direct the UE to engage in an inter-cell handover to the selected LTE carrier. Alternatively, the eNodeB may responsively engage in cross-carrier scheduling to schedule resources for the UE on the selected LTE carrier. If the eNodeB determines that the UE should not operate on a different LTE carrier, the eNodeB may cause the UE to continue operating on the LTE carrier on which it is currently attached to.

As another example, in a CDMA system, each frequency channel could be a separate CDMA carrier in a sector provided by a base transceiver station (BTS), and the BTS could use these techniques as a basis to determine that, when a UE sends an origination request on a particular CDMA carrier, the BTS should transmit an enhanced channel assignment message (ECAM) that directs the UE to communicate on a selected CDMA carrier. As yet another example, a pair of frequency channels could include frequency channels used for different air interface protocols, such as one LTE channel and one CDMA channel. In this example, a system may use the techniques for channel selection among a plurality of channels used in various air interface protocols. Other examples may also be possible.

Exemplary embodiments have been described above. Those skilled in the art will understand, however, that changes and modifications may be made to these embodiments without departing from the true scope and spirit of the invention.

We claim:

1. A method operable in a wireless communication system including a base station that radiates to provide wireless coverage in which to serve user equipment devices (UEs), where the base station is configured to operate on a plurality of channels, each having a respective level of port-to-port isolation, the method comprising:
   determining, by the wireless communication system, a measure of quality of an air interface between the base station and a UE served by the base station;
   selecting by the wireless communication system, from the plurality of channels, a channel on which the base station should serve the UE, wherein the selecting is based at least in part on (i) the determined measure of quality of the air interface between the base station and the UE and (ii) a correlation between the determined measure of quality of the air interface and the respective level of port-to-port isolation of the channel; and
   based on the selecting, the base station serving the UE on the selected channel.

2. The method of claim 1, wherein selecting a channel on which the base station should serve the UE comprises:
   determining whether the measure is within a first set of measures or a second set of measures, wherein the first set of measures corresponds to a higher quality of the air interface than the second set of measures;
   if the determination is that the measure is within the first set of measures, then selecting as the channel a channel having first level of port-to-port isolation; and
   if the determination is that the measure is within the second set of measures, then selecting as the channel a channel having a second level of port-to-port isolation, wherein the second level of port-to-port isolation is higher than the first level of port-to-port isolation.

3. The method of claim 1, wherein the wireless communication system comprises data storage that contains information related to the respective levels of port-to-port isolation for the plurality of channels, wherein selecting the channel involves obtaining the information related to the respective levels of port-to-port isolation for the plurality of channels.

4. The method of claim 1, wherein the measure comprises a Channel Quality Indicator (CQI).

5. The method of claim 1, wherein the selected channel has a plurality of associated levels of port-to-port isolation, and wherein the respective level of port-to-port isolation of the channel is a lowest level among the plurality of associated levels of port-to-port isolation.

6. The method of claim 1, wherein serving the UE on the selected channel comprises transitioning the UE from being served on a current channel to being served on the selected channel.

7. The method of claim 6, wherein the current channel has a first level of port-to-port isolation, and wherein the selected channel has a second level of port-to-port isolation that is different from the first level of port-to-port isolation.

8. The method of claim 7, wherein the current channel has a plurality of associated levels of port-to-port isolation, and wherein the first level of port-to-port isolation is a lowest level among the plurality of associated levels of port-to-port isolation.

9. The method of claim 1, wherein serving the UE on the selected channel comprises maintaining service to the UE on a current channel that the UE is being served on.

10. A non-transitory computer readable medium having stored thereon instructions executable by a processor to cause a wireless communication system to perform functions, the wireless communication system including a base station that radiates to provide wireless coverage in which to serve user equipment devices (UEs), where the base station is configured to operate on a plurality of channels, each having a respective level of port-to-port isolation, the functions comprising:
   determining a measure of quality of an air interface between the base station and a UE served by the base station;
   selecting, from the plurality of channels, a channel on which the base station should serve the UE, wherein the selecting is based at least in part on (i) the determined measure of quality of the air interface between the base station and the UE and (ii) a correlation between the determined measure of quality of the air interface and the respective level of port-to-port isolation of the channel; and based on the selecting, the base station serving the UE on the selected channel.

11. The non-transitory computer readable medium of claim 10, wherein the measure comprises a Channel Quality Indicator (CQI).

12. The non-transitory computer readable medium of claim 10, wherein the selected channel has a plurality of associated levels of port-to-port isolation, and wherein the respective level of port-to-port isolation of the channel is the lowest level among the plurality of associated levels of port-to-port isolation.

13. The non-transitory computer readable medium of claim 10, wherein serving the UE on the selected channel comprises transitioning the UE from being served on a current channel to being served on the selected channel.

14. The non-transitory computer readable medium of claim 13, wherein the current control channel has a first level of port-to-port isolation, and wherein selecting a channel on which the base station should serve the UE comprises selecting a channel having a second level of port-to-port isolation that is different from the first level of port-to-port isolation.

15. The non-transitory computer readable medium of claim 14, wherein selecting a channel having a second level of port-to-port isolation that is different from the first level of port-to-port isolation comprises:
    determining whether the measure is within a first set of measures or a second set of measures, wherein the first set of measures corresponds to a higher quality of the air interface than the second set of measures;
    if the determination is that the measure is within the first set of measures, then selecting as the channel a channel having a second level of port-to-port isolation that is lower than the first level of port-to-port isolation; and
    if the determination is that the measure is within the second set of measures, then selecting as the channel a channel having a second level of port-to-port isolation that is higher than the first level of port-to-port isolation.

16. A wireless communication system comprising:
    a base station that radiates to provide wireless coverage in which to serve user equipment devices (UEs), wherein the base station is configured to operate on a plurality of channels, each having a respective level of port-to-port isolation; and
    a controller configured to:
        determine a measure of quality of an air interface between the base station and a UE served by the base station;
        select, from the plurality of channels, a channel on which the base station should serve the UE, wherein the selecting is based at least in part on (i) the determined measure of quality of the air interface between the base station and the UE and (ii) a correlation between the determined measure of quality of the air interface and the respective level of port-to-port isolation of the channel; and
        based on the selecting, cause the base station to serve the UE on the selected channel.

17. The wireless communication system of claim 16, wherein selecting a channel on which the base station should serve the UE comprises:
    determining whether the measure is within a first set of measures or a second set of measures, wherein the first set of measures corresponds to a higher quality of the air interface than the second set of measures;
    if the determination is that the measure is within the first set of measures, then selecting as the channel a channel having a level of port-to-port isolation that is within a first set of levels of port-to-port isolation; and
    if the determination is that the measure is within the second set of measures, then selecting as the channel a channel having a level of port-to-port isolation that is within a second set of levels of port-to-port isolation, wherein the levels within the second set of levels of port-to-port isolation are higher than the levels within the first set of levels of port-to-port isolation.

18. The wireless communication system of claim 16, further comprising data storage that contains information related to the respective levels of port-to-port isolation for the plurality of channels, wherein selecting the channel involves obtaining the information related to the respective levels of port-to-port isolation for the plurality of channels.

19. The wireless communication system of claim 16, wherein serving the UE on the selected channel comprises transitioning the UE from being served on a current channel to being served on the selected channel.

20. The wireless communication system of claim 16, wherein the controller is part of the base station.

* * * * *